US012559144B2

(12) United States Patent
Schmid

(10) Patent No.: US 12,559,144 B2
(45) Date of Patent: Feb. 24, 2026

(54) ENERGY-SUPPLYING DOUBLE-DECK CARRIAGE, RAIL VEHICLE AND METHOD OF MANUFACTURING A DOUBLE-DECK CARRIAGE

(71) Applicant: Stadler Rail AG, Bussnang (CH)

(72) Inventor: Kuno Schmid, Winterthur (CH)

(73) Assignee: Stadler Rail AG, Bussnang (CH)

( * ) Notice: Subject to any disclaimer, the term of this patent is extended or adjusted under 35 U.S.C. 154(b) by 946 days.

(21) Appl. No.: 17/579,154

(22) Filed: Jan. 19, 2022

(65) Prior Publication Data

US 2022/0227234 A1     Jul. 21, 2022

(30) Foreign Application Priority Data

Jan. 21, 2021     (EP) ..................................... 21152794

(51) Int. Cl.
| | |
|---|---|
| B61C 3/00 | (2006.01) |
| B60L 5/00 | (2006.01) |
| B60L 9/02 | (2006.01) |
| B60L 9/16 | (2006.01) |
| B61D 1/06 | (2006.01) |

(52) U.S. Cl.
CPC .................. B61C 3/00 (2013.01); B60L 5/00 (2013.01); B60L 9/02 (2013.01); B60L 9/16 (2013.01); B61D 1/06 (2013.01); *B60L 2200/26* (2013.01)

(58) Field of Classification Search
CPC ............. B61C 3/00; B61C 3/02; B61C 17/00; B60L 2200/26; B60L 5/00; B60L 9/02; B60L 9/16; B61D 1/06
See application file for complete search history.

(56) References Cited

U.S. PATENT DOCUMENTS

| | | | | |
|---|---|---|---|---|
| 6,097,181 | A * | 8/2000 | Russo ................... | H02M 7/003 |
| | | | | 363/141 |
| 10,611,385 | B2 * | 4/2020 | Forrer ...................... | B61D 1/06 |
| 11,062,835 | B2 * | 7/2021 | Weber ................... | H01F 27/306 |
| 2016/0075350 | A1 * | 3/2016 | Becker ................... | B60L 15/40 |
| | | | | 701/19 |
| 2016/0176414 | A1 * | 6/2016 | Lamba ................... | B60L 50/61 |
| | | | | 105/35 |
| 2016/0211494 | A1 * | 7/2016 | Kurosu ............... | H01M 10/425 |

FOREIGN PATENT DOCUMENTS

| | | | | | |
|---|---|---|---|---|---|
| CN | 204250048 | U | * | 4/2015 | |
| DE | 102009008549 | A1 | | 8/2010 | |
| EP | 2030860 | A1 | * | 3/2009 | ............... B61D 1/06 |
| EP | 2335993 | A1 | | 6/2011 | |
| EP | 2423066 | A2 | * | 2/2012 | ......... B60L 15/2045 |
| EP | 3626509 | A1 | * | 3/2020 | ........... B60L 15/007 |
| RU | 191958 | U1 | * | 8/2019 | ............. B61C 17/00 |
| WO | WO-2004035366 | A2 | * | 4/2004 | ............... B61C 3/00 |

OTHER PUBLICATIONS

European Search Report received from European Patent Office for European Application No. EP21152794.0, 9 pages. (Translation not availble).

* cited by examiner

*Primary Examiner* — Cheng Lin

(74) *Attorney, Agent, or Firm* — Finch & Maloney PLLC

(57)     ABSTRACT

The invention relates to an energy-supplying double-deck carriage, in particular a passenger double-deck carriage, for power supply, in which a main transformer is arranged in the roof region, preferably on or at the roof, and moreover preferably substantially above a bogie.

19 Claims, 4 Drawing Sheets

Figure 1:
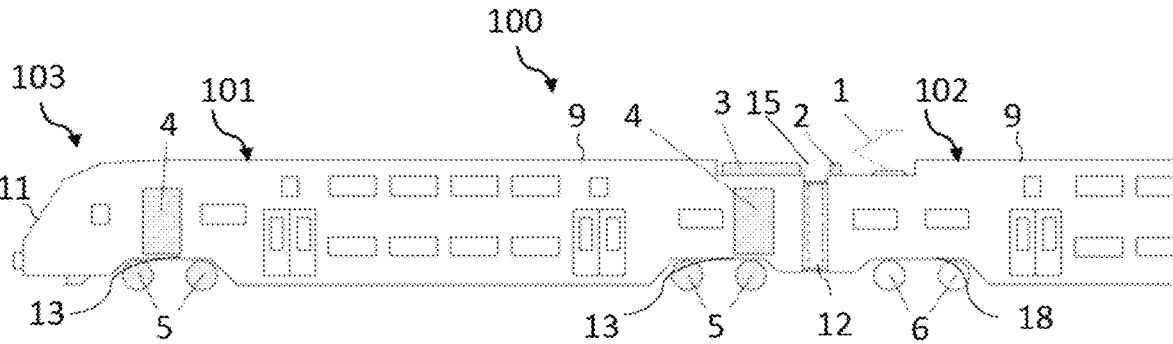

ENERGY-SUPPLYING DOUBLE-DECK CARRIAGE, RAIL VEHICLE AND METHOD OF MANUFACTURING A DOUBLE-DECK CARRIAGE

The invention is directed to an energy-supplying double-deck carriage, a rail vehicle and a method of manufacturing such an energy-supplying double-deck carriage.

A transformer is typically formed in electrically powered rail vehicles so that the voltage provided by the external power supply, can be brought to the required nominal voltage to operate the vehicle.

In double-deck carriages, the transformer is usually placed inside the carriage body in a technical compartment, so that less space is available for passengers.

Typically, traction components are placed in a distributed manner in double-deck carriages.

However, placing several transformers in one place to reduce space requirements has the disadvantage that the total weight is greater while efficiency remains the same. It is known in the prior art to be advantageous to use only one transformer for a carriage.

It is therefore an object of the present invention to overcome these disadvantages of the prior art and to present a device which enables the arrangement of only exactly one main transformer in an energy-supplying double-deck carriage without creating a large loss of space.

The task is solved by an energy-supplying double-deck carriage, a rail vehicle and a method for manufacturing a rail vehicle according to the independent claims.

An energy-supplying double-deck carriage for power supply, in particular a passenger double-deck carriage, comprises a main transformer, a power supply line to the main transformer, at least one bogie and a roof. The main transformer of the energy-supplying double-deck carriage is arranged in a roof region, preferably substantially above a bogie, in particular at or on the roof.

An energy-supplying double-deck carriage in this case refers to a double-deck carriage that can convert a voltage from a power supply, in particular an external power supply, into a nominal voltage required for the vehicle and can be used in a rail vehicle. The energy-supplying double-deck carriage is in particular a double-deck rail vehicle carriage. In this context, the term energy-supplying double-deck carriage refers to the carriage with the main transformer, so that the transformer of the energy-supplying double-deck carriage can itself be supplied with power by another carriage.

In this context, the bogie can be a Jacobs bogie or a normal bogie. It can also be a running bogie or a drive bogie.

A carriage end of a double-deck carriage designates an area which comprises the last third of the double-deck carriage along its longitudinal axis to the end of the double-deck carriage. The term "above the bogie" in this context refers to the area vertically above the bogie of the last third of the carriage in which the bogie is located.

The main transformer is the transformer that, among other things, provides power for traction.

The arrangement of a single main transformer allows for reduced weight of the energy-supplying double-deck carriage. In addition to the increased efficiency in terms of weight of a single main transformer, easier attachment of the high voltage cables and a shorter power supply line is made possible. On the one hand, such an attachment of the high-voltage cables facilitates the laying of the high-voltage cables and, on the other hand, increases the electromagnetic compatibility. In addition, the use of a main transformer allows the use of only one main switch. The power supply lines can also be heavy and it is therefore advantageous to keep the required length short.

The roof region is arranged vertically significantly closer to current collectors and in particular overhead lines and is thus very well suited for mounting the main transformer, since the power supply lines to the main transformer can be kept shorter.

This advantageous arrangement and optimized weight of the main transformer optimize the space for passengers in the energy-supplying double-deck carriage.

The main transformer is preferably located substantially above a bogie so that the axle load is not exceeded and the bogie located below bears the main load of the main transformer weight. Furthermore, mounting the roof transformer in the roof region still ensures high stability against crosswinds, since the maximum axle load can be utilized.

The main transformer can be arranged substantially centrally in the transverse direction of the energy-supplying double-deck carriage, preferably with the longest extent of the main transformer parallel to the longitudinal axis.

Such an arrangement of the main transformer has the advantage that the center of gravity of the main transformer is located centrally in the vehicle in the transverse direction and weight asymmetries are avoided.

The transformer cooling system for the main transformer can also be arranged in the roof region on the main transformer, eliminating the need for long lines and hydraulic interfaces.

An energy-supplying double-deck carriage may preferably include at least one main switch, preferably located in the power supply line to the main transformer, providing a selectively disconnectable connection.

A selectively disconnectable connection means that the electrical connection is fully disconnectable, wherein this is manually or power operated. Selectively disconnectable further means that the power supply line from the external power source to the main transformer is disconnectable and/or the power supply line from the main transformer to the external power source is disconnectable. In addition, selectively disconnectable in this context means that a connection can be both disconnected and reconnected.

A non-energy-supplying carriage of a rail vehicle may further also include at least one main switch, preferably disposed in the power supply line to the main transformer that provides a selectively disconnectable connection.

A main switch provides additional protection and safety to disconnect the energy-supplying double-deck carriage from the electrical supply, and can serve with additional devices as a protective device in case of over-voltage, under-voltage, and overcurrent.

The main switch is preferably located on the double-deck carriage having the current collector, so that there need be no connection to an adjacent double-deck carriage in between. Thus, the current supply can preferably be interrupted on the double-deck carriage that has the current collector before the connection to other carriages. In this case, the current collector does not necessarily have to be located on an energy-supplying double-deck carriage.

Placing the main switch on the double-deck carriage with current collector allows connections between double-deck carriages to be formed safely despite the presence of the power supply. In this context, the double-deck carriage with current collector and main switch can in particular be an end carriage.

In the case of several current collectors per carriage and/or rail vehicle, it is necessary that each connection from the respective current collector to a main transformer is individually electrically selectively disconnectable by a main switch.

An energy-supplying double-deck carriage may preferably comprise one or two current collectors, which supplies power to at least one main transformer via the power supply line.

The arrangement of a current collector and preferably main switch on an energy-supplying double-deck carriage is particularly suitable for middle carriages, since these do not have to have a heavy crash front and the weight distribution is easier to compensate, at least partially. In a middle carriage, the main transformer can be located on the opposite car end of the energy-supplying double-deck carriage of the current collector, while still providing advantageous weight distribution and at least partially compensated axle load.

At least one bogie of an energy-supplying double-deck carriage may be a drive bogie.

A drive bogie comprises at least one, in particular two, driven axles.

In particular, all bogies of the energy-supplying double-deck carriage are drive bogies.

An energy-supplying double-deck carriage preferably comprises at least one converter, in particular one converter being formed per powered bogie. In particular, the converter is preferably arranged essentially above a bogie. Further preferably, one converter is arranged above each powered bogie.

All converters of a carriage, in particular of an energy-supplying double-deck carriage, are fed by the main transformer.

The converter feeds the traction motors of a bogie and is preferably arranged close to the bogie.

In particular, the use of one converter per bogie is advantageous. In terms of weight distribution, it is thus possible to arrange both the main transformer and a converter on one end of a carriage, in particular an energy-supplying double-deck carriage.

In this arrangement, one converter preferably supplies the motors for all axles of the drive bogie.

The energy-supplying double-deck carriage can include a cooling device, the cooling device being arranged in such a way that it can be used for converter and traction motor of the motor bogie.

A cooling device can be used for both the converter(s) and the traction motor(s) of the powered bogie together if there is a small distance between the converter and traction motor. The cooling device sucks in outside air by means of a fan and forces it to the traction motors. The converter cooler can optionally also be arranged in the traction motor air flow, on the suction side or the pressure side of the fan.

The distance between the converter and the traction motor is kept as short as possible, so that the cooling device must have the shortest possible supply and discharge lines and the cooling device can be used for both the converter(s) and the traction motor(s). Weight is thus advantageously reduced since two or more separate cooling devices are not required.

Preferably, the cooling device can be mounted on the opposite side of the energy-supplying double-deck carriage from a converter in the transverse section so that the center of gravity of the energy-supplying double-deck carriage is substantially centered on the transverse axis.

Preferably, a non-energy-supplying double-deck carriage may also include a cooling device, the cooling device being arranged to be usable by the converter and traction motor of the powered bogie.

In general, a mirror-symmetrical arrangement of similarly heavy components with respect to a vertical plane of the longitudinal axis is advantageous if this is possible, since such an arrangement does not cause asymmetries. Thus, asymmetric loading of the wheels is avoided.

A point-symmetrical arrangement to the center of the transverse axis of the energy-supplying double-deck carriage is also conceivable, so that at least a substantially central center of gravity is ensured.

Preferably, all particularly heavy components, such as the converter and the transformer cooling system, are to be arranged as vertically low as possible so that the center of gravity of the energy-supplying double-deck carriage is not too high and the main transformer is compensated for in the roof region.

The energy-supplying double-deck carriage may have a reinforced carriage body structure, preferably by a closed profile along the side walls and/or ceiling and/or floor of the energy-supplying double-deck carriage, to support the weight of the main transformer in the roof region.

The weight of the main transformer is thus reliably supported by the carriage body structure so that safety and structural integrity can be ensured.

Reinforcing the side walls and/or ceiling and/or floor with a closed profile, ribs and/or beams is suitable for mounting the main transformer securely.

The transformer preferably has a length of 2.5 m, a width of 2.5 m and a height of 1 m. The weight of the transformer including the cooling device is preferably 5 t.

An energy-supplying double-deck carriage can be an end carriage, which in particular has a front. The main transformer is arranged at the end opposite the front substantially in the last third of the carriage so that the axle load does not exceed 21 t, preferably 20 t, when properly provided for loading.

The energy-supplying double-deck carriage may be a middle carriage.

Thus, one of the heavy portions of the traction chain can be arranged on a middle carriage so that weight distribution can take place not only within a carriage, but within the rail vehicle.

The invention is applicable to AC and DC power supply. Accordingly, DC-specific parts and the system changeover switches can be arranged in the roof region of the double-deck carriage adjacent to the energy-supplying double-deck carriage, analogously to the main transformer in the case of AC.

The task is further solved by a rail vehicle comprising at least one energy-supplying double-deck carriage as previously described.

The rail vehicle comprises at least one energy-supplying double-deck carriage.

The carriages of the rail vehicle have a connection such that one energy-supplying double-deck carriage can supply energy to and/or receive energy from another carriage.

Such a rail vehicle has an optimized passing space with optimal weight distribution.

The rail vehicle may comprise at least one, in particular two, energy-supplying double-deck carriages as end carriages.

An end carriage is equipped with a front and preferably crash front, and the design as an energy-supplying double-deck carriage optimizes passenger capacity and weight distribution.

Since an end carriage has a front usually with a crash front as collision protection causing a high weight at one carriage end of the end carriage, it is advantageous that the main transformer is arranged on the opposite carriage end to balance the weight distribution of the axle loads as much as possible.

In particular, it is advantageous to arrange the main transformer on an energy-supplying double-deck carriage that does not have a current collector but is supplied with power from another carriage, so that the weight distribution in the energy-supplying double-deck carriage is optimized.

Preferably, the rail vehicle comprises two end carriages, with preferably identical configurations in mirror-inverted arrangement on opposite sides. However, it would also be conceivable to have a normal double-deck carriage as the end carriage, serving as the control car.

At least one current collector each can be arranged on a middle carriage connected to one, in particular both, end carriages, and the power supply line can thus run from or to the middle carriages to or from the end carriages, in particular the middle carriage with current collector also comprises a main switch.

This has the advantage that an end carriage can be operated by the power supply line of the current collector of a middle carriage and at the same time the weight distribution is optimized. Preferably, but not necessarily, the middle carriage is immediately adjacent to the end carriage, i.e. the closest carriage, so that the power supply and removal can be kept to a minimum, which reduces weight and thus saves costs. It is also conceivable to place the current collector on a middle carriage that is not directly adjacent to an end carriage. The mounting of the current collector is preferably carried out taking into account space considerations and weight distribution in such a way as to minimize the number of car transitions of the power supply and return lines in the form of high-voltage and/or power cables.

Preferably, the rail vehicle comprises a middle carriage on which one or two current collectors are arranged, the power supply line between current collector and main transformer being disconnectable by a main switch, in particular disconnectable by two main switches.

When two current collectors are arranged on a rail vehicle and in particular double-deck carriages, the power supply lines preferably run along the entire longitudinal axis of the carriage and the current collectors are preferably connected to each other.

The rail vehicle may comprise at least one, preferably two, energy-supplying double-deck carriages as middle carriages.

The use of middle carriages as energy-supplying double-deck carriages is useful both for operating a non-energy-supplying end carriage and/or middle carriage, and for increased power requirements. By having at least one middle carriage be an energy-supplying double-deck carriage, the power of the rail vehicle can be adjusted.

The main transformer and the rail vehicle drive by powered bogies, which have at least partially driven axles, can thus be arranged on one or more middle carriages.

In this context, the end carriages can comprise either drive bogies or running bogies, i.e. they can be at least partially driven or merely serve as control cars.

The main transformer of the energy-supplying double-deck carriage can be arranged on the facing end of the carriage to an end carriage so that the latter can be supplied with power. This allows the weight distribution of the end carriage to be optimized so that two converters can be arranged in the carriage end of an end carriage, since the end carriage does not include a main transformer.

This is particularly advantageous to achieve advantageous weight distribution of the end carriage when the end carriage is a double-deck carriage with a heavy crash front at one end of the carriage.

The rail vehicle may further comprise at least one, preferably two, end carriages.

Each end carriage energized by the energy-supplying double-deck carriage preferably includes two converters, such that a power supply line is formed from the main transformer on the center carriage to the converter in the end carriage.

The arrangement of the main transformer on a carriage other than the end carriage is particularly advantageous, since the end carriages must be particularly optimized for weight and weight distribution due to the additional weight of the crash front.

In addition, the arrangement of two converters above one bogie on an end carriage is only possible in terms of weight if the main transformer is located on a different carriage. An exception to this would be the use of a particularly light transformer as the main transformer, such as a 50 Hz transformer.

The end carriages of the rail vehicle may each comprise drive bogies.

Preferably, all bogies of the respective end carriage are drive bogies, and in particular preferably all axles of the drive bogies of the end carriages are driven, so that one converter per drive bogie can drive all axles of a drive bogie with the aid of the main transformer.

In this context, it would also be conceivable to use a single converter to drive two drive bogies.

The middle carriages of the rail vehicle may comprise running bogies. In particular, all bogies of the middle bogies may be running bogies.

Alternatively, at least some bogies of the middle carriages may comprise drive bogies.

Thus, an energy-supplying double-deck carriage does not necessarily comprise a drive bogie, but can feed adjacent drive bogies of other carriages.

This arrangement allows modular adaptation of the rail vehicle according to the requirements needed. Preferably, it is a rail vehicle with two end carriages on either end of the rail vehicle, which can be supplemented. The rail vehicle can be supplemented with middle carriages with running bogies and additionally with energy-supplying middle carriages with drive bogies if the motorization is no longer sufficient for the length and weight of the rail vehicle, or if an end carriage is to be supplied by an energy-supplying middle carriage.

This allows flexible use of the rail vehicle with at least one main transformer in the roof region despite the use of double-deck carriages.

The task is further solved by a method of manufacturing an energy-supplying double-deck carriage, the main transformer being arranged in a roof region preferably essentially above a bogie, in particular on or at the roof.

The mounting of the main transformer in a roof region also allows easy accessibility and enables additional weight reduction as well as optimization of passenger capacity.

In the process of manufacturing an energy-supplying double-deck carriage, a reinforced carriage body structure can be arranged below the main transformer. In particular, a closed profile is arranged along the side walls, ceiling and floor.

By creating a reinforced carriage body structure, the additional weight in the roof region is supported by the main transformer and safety is ensured.

In the following, embodiments of the invention are described in detail with reference signs. Here shows FIG. 1: A rail vehicle with energy-supplying double-deck carriages as end carriages with a section of the adjacent carriage, FIG. 2: a circuit diagram for a rail vehicle with an energy-supplying double-deck carriage according to FIG. 1, FIG. 3: a rail vehicle with a section of an energy-supplying double-deck carriage as middle carriage and the adjacent carriage, FIG. 4: a circuit diagram for a rail vehicle with an energy-supplying double-deck carriage as the middle carriage according to FIG. 3.

Identical reference signs in the figure indicate identical components.

FIG. 1 shows the arrangement of a main transformer 3 in the roof region on the roof 9 of an end carriage 101. In this embodiment, the main transformer 3 is arranged in the last third of the carriage body near the joint 12.

The converters 4 are each arranged above the drive bogies 13 so that a single cooling device (not shown in FIG. 1) can be used for the traction motors 5 (not shown in FIG. 1) and the converters 4.

Since the energy-supplying double-deck carriage 103 of the rail vehicle 100 is an end carriage 101, the front 11 is equipped with a crash front (not shown in FIG. 1) to ensure safety. This additional weight must be compensated for, taking into account the maximum axle load. In FIG. 1, this additional load on the front is compensated by mounting the main transformer 3 on the opposite end of the car on the roof 9.

The end carriage 101 is also equipped with two drive bogies 13, each with two axles driven by traction motors 5.

The adjacent middle carriage 102 is connected to the end carriage 101 by a formed connection 12 and a power supply connection 15.

The connection from current collector 1 to power supply connection 15 is also formed to be selectively disconnectable by a main switch 2.

The middle carriage 102 has a bogie 18 with two running axles 6 and a current collector 1.

In this embodiment, the current collector 1 of the middle carriage 102 is used to supply electrical power to the end carriage 101.

The current collector 1 is mounted on the non-energy-supplying double-deck car, the middle carriage 102. This mounting of the current collector 1 allows the main transformer 3 to be mounted on the roof 9 of the end carriage 101.

Thus, an advantageous axle load of the rail vehicle 100 is possible, since current collector 1 and main transformer can be arranged on two carriages.

Figure 2:
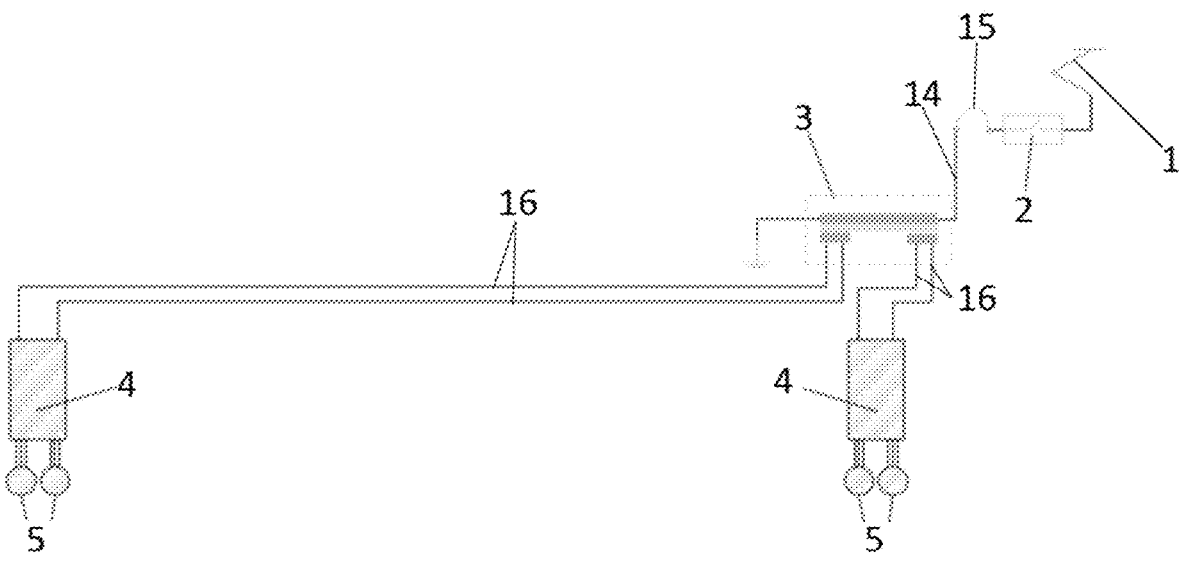

FIG. 2 shows the circuit diagram for a rail vehicle according to FIG. 1, with the current collector 1 being shown selectively connectable to the main transformer 3 via a main switch 2 by means of a power supply connection 15 to the power supply line 14. In this context, the power supply connection 15 connects the power supply line 14 via two carriages.

The transformed current can feed the converters 4 and drive the traction motors 5 of the driven wheelsets via converter current supply and discharge connections 16. Thereby, a converter current supply and discharge 16 extends through the end carriage 101 to the converter 4 at the front drive bogie 13.

Figure 3:
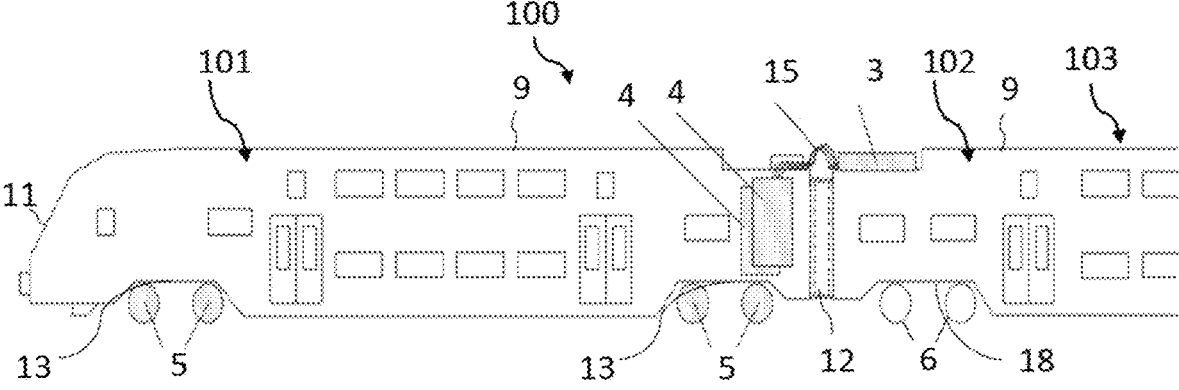

FIG. 3 shows a section of an energy-supplying double-deck carriage 103 as a middle carriage 102 capable of driving a non-energy-supplying end carriage 101.

The main transformer 3 of the energy-supplying double-deck carriage 103 as middle carriage 102 is connected to the end carriage 101 via a power supply connection 15.

The energy-supplying double-deck carriage 103 as the middle carriage 102 has a running bogie 18, with two running axles 6, and a roof 9.

The end carriage 101 has two converters 4 above a powered bogie 13, the converters 4 being arranged on opposite sides for optimized weight distribution.

The converters 4 are designed to feed power to the traction motors 5 of the drive bogies 13 through traction motor cables 17 (not shown in FIG. 3).

Thus the weight of the front 11, with a heavy crash front, is at least partially balanced by two converters 4 on the opposite side, and an at least approximately equal axle load is ensured on both bogies.

Figure 4:
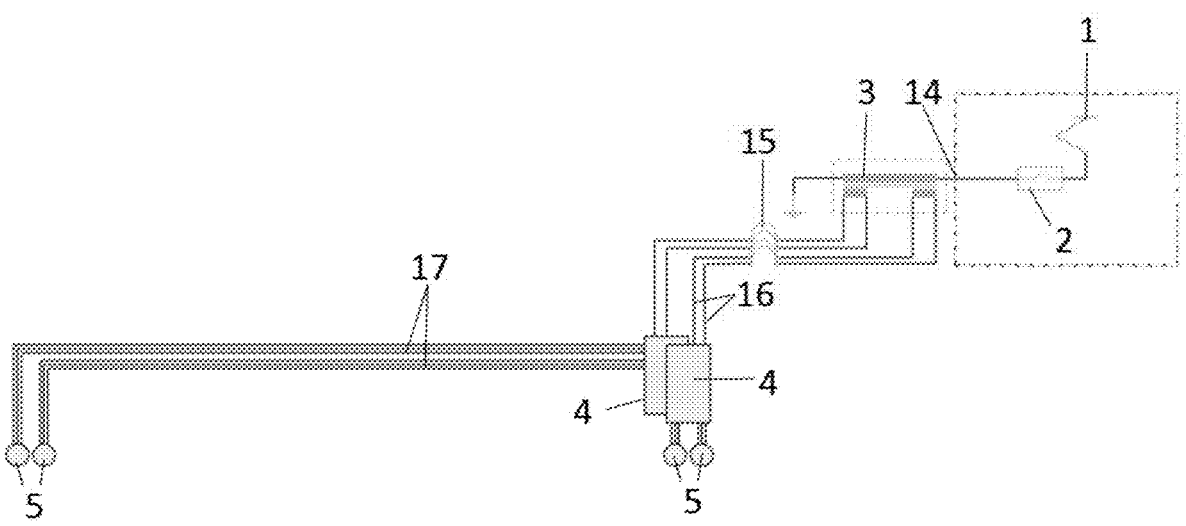

The selectively disconnectable power supply line 14 through a main switch 2 is not shown in FIG. 3, but has been outlined in the dashed area in the circuit diagram in FIG. 4.

FIG. 4 shows the circuit diagram of the rail vehicle of FIG. 3, in which case the dashed delimited area is located on the energy-supplying middle carriage 102 adjacent to the end carriage 101, but not shown in FIG. 3. The dashed area includes a current collector 1 and a power supply line 14 that is selectively disconnectable by a main switch 2.

However, it is also possible to imagine a power supply through a more distant middle carriage 102.

In FIG. 4, the main transformer 3 is arranged on the roof of the middle carriage 102 in front of the power supply connection 15.

The power supply connection 15 bridges the gap through the formed connection 12 between the double-deck carriages.

The converter power supply and discharge connections 16 can thus feed both converters 4 above a drive bogie 13. In addition, a cooling device can thus be used for both converters 4 and traction motors 5, under the two converters 4.

In FIG. 4, the drive bogie 13 at the front 11 of the end carriage 101 is connected to the converter 4 above the rear bogie via the traction motor cable 17, thus avoiding the need to mount a converter 4 above the front bogie. Thus, advantageous weight distribution is made possible, but both drive bogies 13 of the end carriage 101 can still be driven.

The invention claimed is:

1. An energy-supplying double-deck carriage for power supply, in particular a passenger double-deck carriage, comprising a main transformer, a power supply line to the main transformer, at least one bogie and a roof, wherein the main transformer is arranged in a roof region and wherein the energy-supplying double-deck carriage has a reinforced carriage body structure by a closed profile along at least one of side walls and a ceiling and a floor of the energy-supplying double-deck carriage, in order to be able to support the weight of the main transformer in the roof region.

2. The energy supplying double-deck carriage according to claim 1, wherein the main transformer is arranged substantially in the transverse direction of the energy-supplying double-deck carriage centrally.

3. The energy-supplying double-deck carriage according to claim 2, wherein the main transformer is arranged with the longest extent of the main transformer parallel to the longitudinal axis.

4. The energy supplying double-deck carriage according to claim 1, wherein the energy-supplying double-deck carriage comprises at least one main switch.

5. The energy-supplying double-deck carriage according to claim 4, wherein the main switch is arranged in the power supply line to the main transformer and establishes a disconnectable connection.

6. The energy supplying double-deck carriage according to claim 1, wherein the energy-supplying double-deck carriage comprises one or two current collectors which supply power to at least one main transformer via the power supply line.

7. The energy supplying double-deck carriage according to claim 1, wherein at least one bogie is a drive bogie.

8. The energy supplying double-deck carriage according to claim 1, wherein the energy-supplying double-deck carriage comprises at least one converter or one converter per powered bogie.

9. The energy supplying double-deck carriage according to claim 8, wherein the energy-supplying double-deck carriage comprises a cooling device, the cooling device being arranged in such a way that it can be used for converter and traction motor of the drive bogie.

10. The energy-supplying double-deck carriage according to claim 8, wherein the converter is arranged essentially above the bogie or each drive bogie.

11. The energy supplying double-deck carriage according to claim 1, wherein the energy-supplying double-deck carriage is an end carriage which in particular has a front, the main transformer being arranged essentially at the end opposite the front in the last third of the carriage, so that the axle load does not exceed 21 t when properly loaded.

12. The energy supplying double-deck carriage, according to claim 1, wherein the energy-supplying double-deck carriage is a middle carriage.

13. A rail vehicle wherein the rail vehicle comprises at least one energy-supplying double-deck carriage according to claim 1.

14. A rail vehicle according to claim 11, wherein the rail vehicle comprises at least one or two energy-supplying double-deck carriages as end carriages.

15. A rail vehicle according to claim 14, wherein at least one current collector in each case is arranged on a middle carriage connected to one or two end carriages, and the power supply line thus runs from or to the middle carriage to or from the one or two end carriages.

16. The rail vehicle according to claim 15, wherein the middle carriage with current collector comprises a main switch.

17. A rail vehicle according to claims 13, wherein the rail vehicle comprises at least one or two end carriages and at least one middle carriage, each end carriage each comprising one or two converters, the end carriage being supplied with power by the energy-supplying double-deck carriage, so that a power supply line is formed from the main transformer on the middle carriage to the one or two converters in the end carriage.

18. A method for manufacturing an energy-supplying double-deck carriage according to claim 1, wherein the main transformer-is arranged in a roof region on or at the roof.

19. The energy-supplying double-deck carriage according to claim 1, wherein the transformer is arranged substantially above the bogie.

* * * * *